United States Patent [19]

Fox

[11] Patent Number: 4,617,622

[45] Date of Patent: Oct. 14, 1986

[54] SWITCHING TIME CORRECTION CIRCUIT FOR ELECTRONIC INVERTERS

[75] Inventor: David A. Fox, Lima, Ohio

[73] Assignee: Westinghouse Electric Corp., Pittsburgh, Pa.

[21] Appl. No.: 749,359

[22] Filed: Jun. 27, 1985

[51] Int. Cl.⁴ ............................................. H02P 13/20
[52] U.S. Cl. ...................................... 363/98; 363/58; 363/132
[58] Field of Search ..................... 363/16, 56, 57, 58, 363/98, 41, 131, 132

[56] References Cited

U.S. PATENT DOCUMENTS

| 4,443,842 | 4/1984 | Jessee | 363/41 |
| 4,456,949 | 6/1984 | Incledon | 363/56 |
| 4,502,105 | 2/1985 | | 363/41 |
| 4,504,899 | 3/1985 | | 363/56 |

FOREIGN PATENT DOCUMENTS

| 152796 | 8/1985 | European Pat. Off. | 363/41 |

*Primary Examiner*—Peter S. Wong
*Assistant Examiner*—Judson H. Jones
*Attorney, Agent, or Firm*—R. P. Lenart

[57] ABSTRACT

A switching time correction circuit for electronic inverters controls the operation of power pole switches by delaying the application of each transition point in a reference pattern signal to the output switches. The length of the delay is reduced for transition points in the reference signal which correspond to negative power transitions in the power pole switch and the amount of delay time reduction is proportional to the output current of the respective power pole switch. By inserting a variable delay between the reference signal and the power switch, transition points in the output voltage are each delayed by a fixed time with respect to transition points in the reference waveform pattern.

10 Claims, 5 Drawing Figures

SWITCHING TIME CORRECTION CIRCUIT FOR ELECTRONIC INVERTERS

BACKGROUND OF THE INVENTION

This invention relates to electronic inverters and more particularly to circuits for controlling power pole switching in such inverters.

Pulse width modulated DC to AC inverters approximate sine wave outputs by switching power pole switches at a rate higher than the fundamental sine wave frequency. In the design of pulse width modulated DC to AC inverters, it is desirable to switch the power stage in a manner which reduces certain harmonics to low values so as to ease the burden of filtering the output power to obtain a sinusoidal voltage wave. Fairly small errors in switching times can produce harmonic voltages many times greater than desired. This usually results in the use of a circuit filter which is made considerably larger than theoretically necessary to suppress these harmonics.

In a transistor inverter, for example, it is necessary to provide an underlap condition to prevent shoot-through during the switching operation. This means that to switch an output point from one polarity to another, there must be a delay after the conducting transistor is turned off, to be sure it is no longer conducting, before a complementary transistor is turned on. Many times load conditions are such that the second transistor does not conduct at all since load current is shunted through a commutating diode, thereby shortening the switching time to that of the transistor turn off time. Thus the switching time is quite variable depending on the instantaneous load current as well as the transistor turn off characteristic. Therefore, the prescribed switching schedule is not met, resulting in unpredicted harmonics.

The transistors in DC link inverters require a finite time to turn off. Depending upon the design of the base drive circuit and the current level being switched, the turn off time in typical inverters may be as long as 20 microseconds. This time is nearly proportional to the transistor current when current coupled feedback transformer base drive circuits are used. As a result, the actual output voltage pattern of a DC link inverter may vary from the programmed pattern by nearly 20 microseconds depending upon the load and power factor. This timing variation causes distortion in the output voltage. For example, an inverter with a theoretical total harmonic distortion of less than 2% was observed to have an actual total harmonic distortion greater than 8% due to this effect.

Another effect of the transistor turn off time appears at higher power levels. Increasing the power level at the same output voltage requires increased current ratings of the transistor switches and output filters. The variation of turn off time with current, however, remains approximately the same (about 5 microseconds per 100 amperes). This variation means that a transistor providing high current to the inverter output takes longer to switch and the output voltage stays high longer. That is, more output current produces more output voltage. This is a negative resistance effect. For stable operation of the inverter, the negative resistance must be balanced by real, positive resistance in the output filter and wiring. At higher power levels, this positive resistance is designed to be as small as possible, to minimize power losses and maintain high efficiency. Therefore, a power level can be reached where the net resistance is negative and the inverter output becomes unstable. This instability appears as a large current circulating in the output filter at its resonant frequency when the inverter operates at no load.

Switching time correction circuits have been developed to individually correct each switching edge using phase locked loop techniques. Such circuits are disclosed in U.S. Pat. Nos. 4,443,842; 4,502,105 and 4,504,899. Although the methods disclosed in those patents work very well under steady state conditions, they cannot respond to rapidly changing currents produced by negative resistance effects. An additional circuit is needed to eliminate the negative resistance effect.

SUMMARY OF THE INVENTION

This invention seeks to provide a switching time correction circuit which accounts for the dependence of transistor turn off time on output current and the resulting negative resistance effect in an inverter. The power pole switches of an electronic inverter operate in response to a reference signal which includes a plurality of transition points that are used to trigger switching of the inverter output power poles. A switching correction circuit constructed in accordance with this invention monitors the output current of each power pole and delays the application of each transition point in the reference signal to the power pole by a controllable delay period. This controllable delay period is reduced by an amount proportional to the output current prior to a negative power transition of the output current. Negative power transitions occur when power flow is changing from out of the pole to into the pole, that is, when current is transferring from a transistor in one half of the pole output circuit to a diode in the other half. At these transitions, a delay in the output waveform is caused by the turn off time of a power pole transistor.

DESCRIPTION OF THE PREFERRED EMBODIMENT

Figure 1:
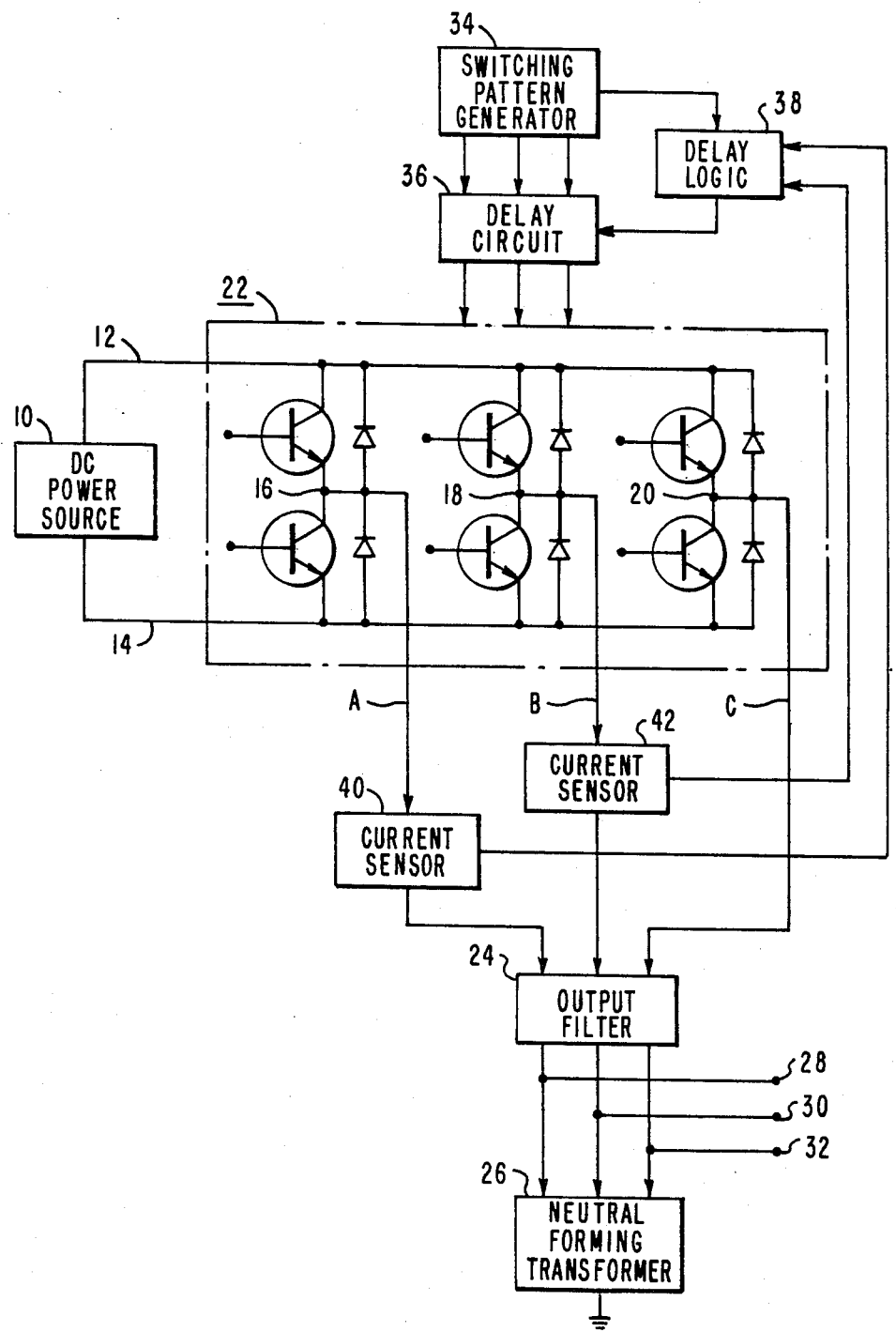
FIG. 1 is a block diagram of a DC link inverter constructed in accordance with one embodiment of the present invention.

Referring to the drawings, FIG. 1 is a block diagram of an electronic inverter constructed in accordance with one embodiment of the present invention. In this embodiment, a DC power source 10 produces first and second voltage levels on a pair of DC link conductors 12 and 14. These voltage levels are alternatively switched to a plurality of output power poles 16, 18 and 20 by a switching circuit 22 to produce a three-phase output on phase conductors A, B and C. This three-phase output is filtered by output filter 24 and connected to a neutral forming transformer 26 to produce the final output on terminals 28, 30 and 32. To produce a sinusoidal output, switching circuit 22 is operated in response to a reference signal produced by switching pattern generator 34. A delay circuit 36 is used to delay the application of each transition point in the reference signal to the switching circuit 22 by a predetermined delay time. Delay logic 38 monitors the current on the phase conductors A, B and C by way of current sensors 40 and 42 and controls the operation of delay circuit 36 to reduce the predetermined delay time by an amount proportional to the output current prior to a negative power transition at each power pole.

In order to simplify discussion, the operation of the present invention will be discussed with respect to the single power pole circuit of FIG. 2. That circuit includes a transistor switching circuit which includes the series connection of a pair of transistors 44 and 46 each having a controllable current path from its respective collector to emitter. These transistor switches are connected between a pair of DC conductors 48 and 50 and are each connected in parallel with a commutating diode 52 and 54. The pole logic circuit 56 includes transistor switch drive circuits which are constructed in accordance with known technology. A reference pole pattern signal P is supplied to terminal 58 and passes through delay circuit 36' to the pole logic circuitry 56. Current sensing circuit 60 monitors the current being delivered to output terminal 62 by way of current transformer 64 and produces a current signal which is delivered to delay logic circuit 38'. This delay logic circuit monitors the reference pattern signal and compares it with the output current signal to determine which transistor or diode is carrying current in the pole switch. If it is determined that a transistor is carrying current, then the delay inserted in the pole pattern reference signal is reduced by an amount proportional to the current. If a diode is carrying current, no reduction occurs in the delay. The net effect is to reduce the variation in output circuit switching times due to output current.

Figure 2:
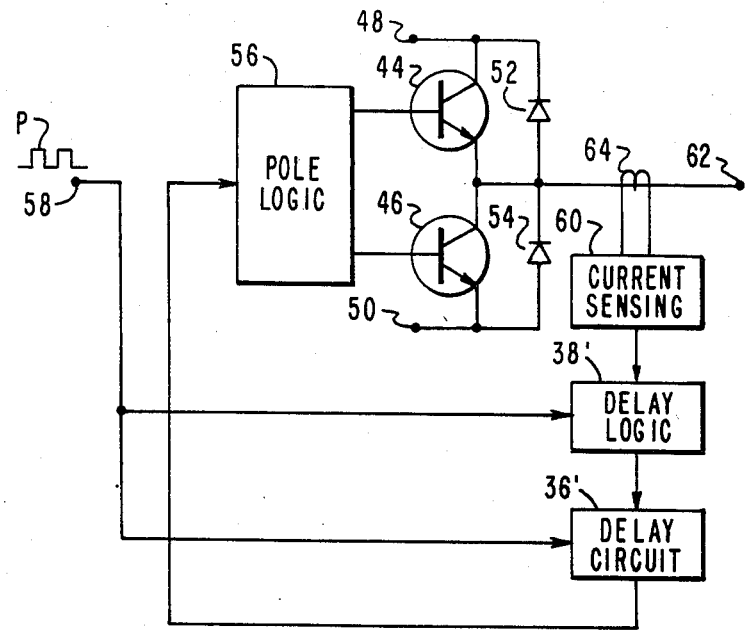
FIG. 2 is a block diagram of a single pole embodiment of the present invention.
Figure 3:
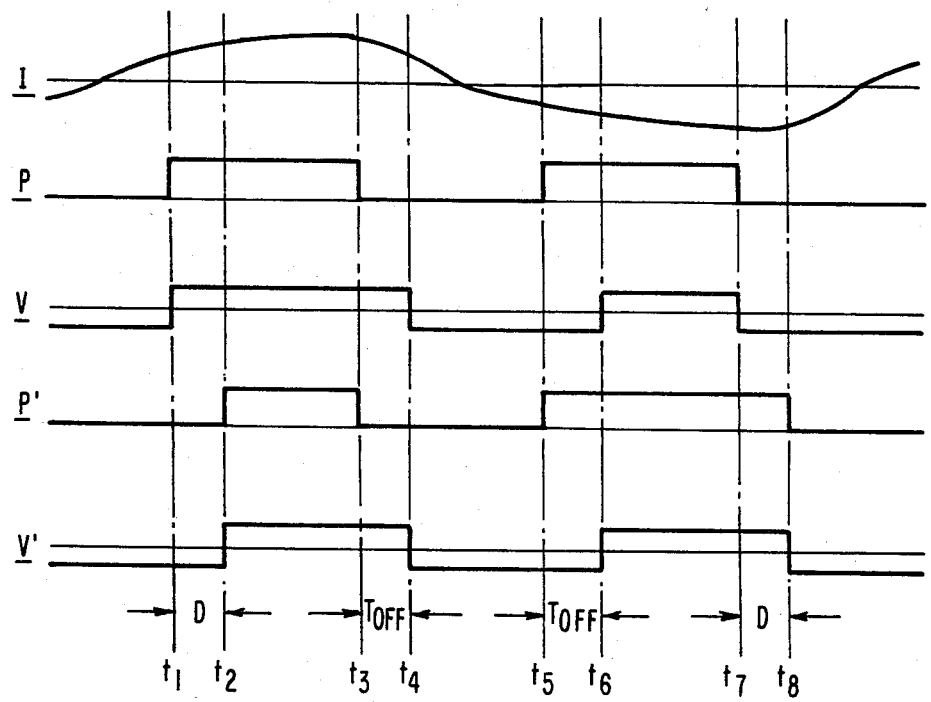
FIG. 3 is a series of waveforms illustrating the operation of the circuit of FIG. 2.

FIG. 3 is a series of waveforms which describe the operation of the circuit of FIG. 2. The reference pole pattern waveform P is applied to the power transistors 44 and 46 by way of pole logic 56 and delay circuit 36'. If the transition points of reference pole pattern signal P are applied to the transistor switching circuit without delay, the resultant output voltage waveform is shown as V. The transistor pole output current is shown as I. At time $t_1$, current is flowing out of the pole, through diode 54 in FIG. 2. When P goes high, there is little or no delay due to the fast turn on response of power transistor 44. Consequently, the output voltage waveform V matches the desired pole switching pattern P. At time $t_3$, however, transistor 44 is conducting output current and when P goes low, it takes a finite time $t_{off}$ to turn off. This causes a delay in a transition point in the output voltage waveform V.

The same delay occurs at time $t_5$. At time $t_7$ there is again no delay, because current is moving from diode 52 to transistor 46. The pattern changes at times $t_1$ and $t_7$ are called positive power transitions because power flow is changing from into the pole to out of the pole. At these transitions, there is little delay. At times $t_3$ and $t_5$ there is a delay in the output waveform caused by the turn off time of the transistors. This turn off time delay is proportional to the current flowing in the transistor at the time.

To summarize, the edges of waveform P at times $t_1$ and $t_7$ are positive power transitions because the current and voltage are the same polarity after switching. Similarly, the edges of waveform P at times $t_3$ and $t_5$ are negative power transitions because the current and voltage have opposite polarities after switching. It can be seen that waveform V is delayed from the desired pattern P at both negative transitions $t_3$ and $t_5$.

The delays in the voltage waveform at the output of the power pole cause considerable distortion in the output of the inverter. This is particularly true in an inverter with many pulses per cycle which are intended to eliminate several of the lower frequency harmonics in the output.

The waveform labeled P' in FIG. 3 is generated from waveform P by adding a small predetermined delay D to all of the power transitions $t_1$, $t_3$, $t_5$ and $t_7$. At the negative power transitions only ($t_3$ and $t_5$) the delay is reduced by a time which is proportional to the output current signal I. In this example, it is reduced to zero and $T_{off}$ represents the transistor turn off time. When the modified pole switching pattern P' is applied to the power transistors of FIG. 2, the output waveform V' results. Note that V' matches the desired switching pattern P but is delayed by a uniform amount. The delay has no effect on the output of the inverter as long as all phases have the same delay. Since the delay reduction is proportional to pole current, the maximum delay must be equal to or greater than the maximum transistor turn off time. The undesirable negative resistance effect described above has thus been eliminated by means of a disclosed variable delay.

Figure 4:
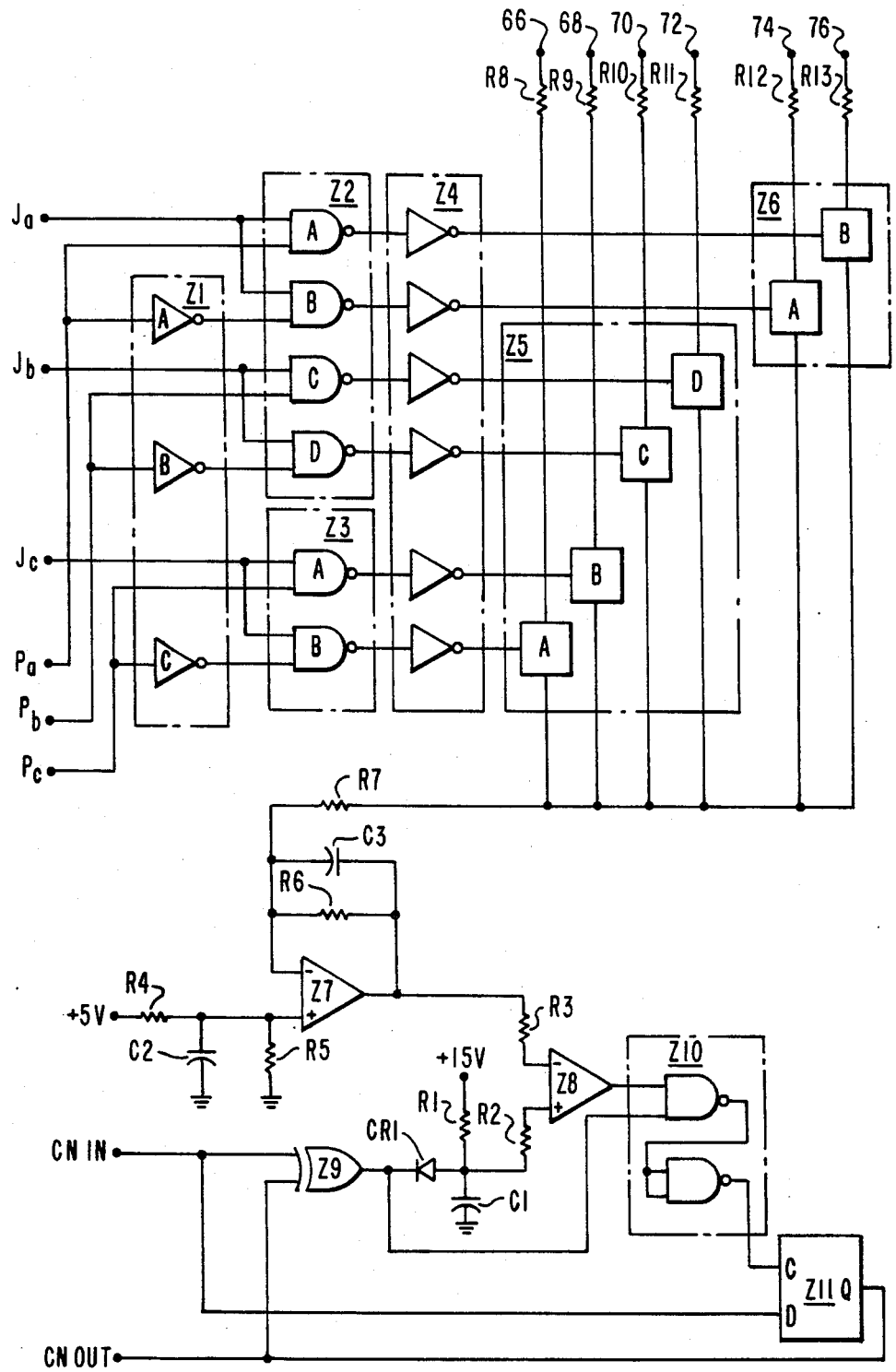
FIG. 4 is a schematic diagram of the delay circuitry of one embodiment of the present invention.

FIG. 4 is a schematic diagram of delay circuitry which may be used to practice the invention. This circuit is designed for use with the circuit disclosed in previously referenced U.S. Pat. No. 4,443,842 which is hereby incorporated by reference. The basic predetermined time delay is formed by the network comprised of R1 and C1. When the output of exclusive OR gate Z9 goes high, capacitor C1 charges up to trigger comparator Z8. Flip-flop Z11 is then clocked to change its output to the same state as the input line. Exclusive OR gate Z9 compares the input and output states of flip-flop Z11 and starts the time delay whenever they are different. A time delay is thus developed for both rising and falling edges of the input signal. The output signal of the circuit follows the input signal with a delay proportional to the voltage on the inverting input of comparator Z8. As this voltage increases, capacitor C1 takes longer to reach the same level, causing a longer delay.

Figure 5:
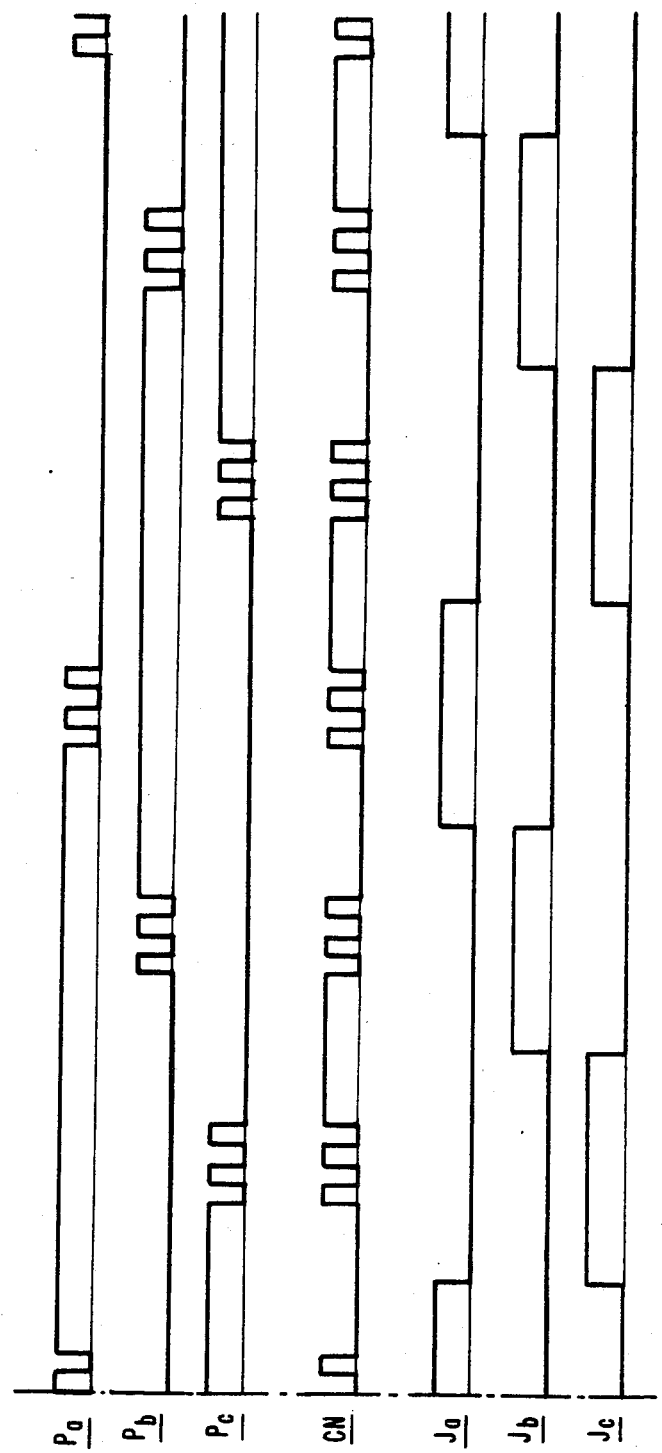
FIG. 5 is a waveform diagram which illustrates the operation of the circuit of FIG. 1.

The circuit of FIG. 4 will provide corrected pattern signals for a three-phase inverter having three power poles. FIG. 5 illustrates the switching pattern signals for the three power poles, labeled $P_a$, $P_b$ and $P_c$. Note that only one signal is active in any specific 60 degree interval. For simplicity, a pattern with only five pulses per cycle is illustrated. However, it should be understood that the concept will work with any pulse number. The circuit of U.S. Pat. No. 4,443,842 is designed to operate with a signal formed from the three pole signals. That signal, CN, results from performing an exclusive OR operation on all three pole signals. FIG. 5 also shows signal CN.

Timing corrections developed by the circuit of U.S. Pat. No. 4,443,842 are applied to the CN signal before it is input to the circuit of the present invention. The basic prior art inverter pattern generating circuit, not shown here, can develop signals $J_a$, $J_b$ and $J_c$ which steer the corrected CN signal to the proper pole. Signals $J_A$, $J_b$ and $J_c$ are logic signals that indicate which pole is switching next. Only one J signal is high at any given time. The present invention uses the J signals to connect the proper current signal from the transistor that is turning off.

This connection is shown in FIG. 4 where the signals $P_a$, $P_b$ and $P_c$ represent the reference switching pole patterns for each pole. Gates Z1, Z2, Z3 and Z4 form a data selector that drives six analog switches Z5 and Z6. These switches connect the proper current sensing signal supplied on terminals 66, 68, 70 72, 74 and 76, to amplifier Z7. The current sensing signals are derived from current transformers as shown in FIGS. 1 and 2, with, for example, the phase C current signal being supplied to terminals 66 and 68; the phase B current signal being supplied to terminals 70 and 72; and the phase A current signal being supplied to terminals 74 and 76. Each switch is turned on at the proper time to sense the current of the transistor that is to be turned off next. Amplifier Z7 amplifies and shifts the current signal to form a 0–5 volt reference for the time delay circuit. When the transistor current is high, the output of Z7 is low, causing the time delay to be very short. When the current is low, the time delay is longer. The gain of the circuit may be adjusted by changing the values of resistor R1 and capacitor C1 or by changing the resistor values around Z7.

To provide a more complete description of the circuit of FIG. 4, Table I includes a description of the components used to construct the circuit of FIG. 4.

TABLE I

| Circuit Reference | Value |
|---|---|
| R1 | 47k |
| R2-7 | 10k |
| R8-13 | 1k |
| C1 | 470 pF |
| C2 | .1 μf |
| C3 | 100 pF |
| Z1, 4 | MC14049UB |
| Z2, 3, 10 | MC14011B |
| Z5, 6 | MC14066B |
| Z7 | CA3160 |
| Z8 | CA3140 |
| Z9 | MC14070B |
| Z11 | MC14013 |

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A switching time correction circuit comprising:
    a switching circuit for alternately switching a power pole between first and second voltage levels, said switching circuit being responsive to a reference signal having a plurality of voltage transition points;
    means for delaying the application of said reference signal transition points to said switching circuit, by a predetermined delay time; and
    means for reducing said delay time for transition points in said reference signal which correspond to negative power transitions in said switching circuit, wherein the amount of delay time reduction is proportional to the output current of said switching circuit.

2. A switching time correction circuit as recited in claim 1, wherein said switching circuit comprises:
    a pair of transistors each having a controllable current path, wherein the controllable current paths are electrically connected in series between a pair of conductors supplying said first and second voltage levels and said power pole is a junction point between the controllable current paths; and
    a pair of diodes, each of said diodes being electrically connected in parallel with one of said controllable current paths.

3. A switching time correction circuit as recited in claim 2, wherein said predetermined delay time is greater than or equal to the maximum turn off time of said transistors.

4. A pole switch firing control circuit for controlling an electronic inverter in accordance with a reference pulse signal having a plurality of transition points, said control circuit comprising:
    means for measuring the output current of the pole switch; and
    means for delaying the application of each transition point, in the reference pulse signal, to said pole switch by a controllable delay period, wherein said controllable delay period is reduced by an amount proportional to said output current prior to negative power transitions of said output current.

5. A pole switch firing control circuit as recited in claim 4, wherein the pole switch includes a transistor having a controllable current path and a diode electrically connected in parallel with said controllable current path and said negative power transitions occur when said controllable current path is conducting current.

6. A pole switch firing control circuit as recited in claim 5, wherein the maximum duration of said controllable delay period is greater than or equal to the maximum turn off time of said transistor.

7. A method of controlling the switching of a power pole switch in an electronic inverter in response to transition points in a reference signal, said method comprising the steps of:
    delaying each transition point in said reference signal by a predetermined delay time; and
    reducing the delay time for transition points in said reference signal which correspond to negative power transitions in said power pole switch wherein the amount of delay time reduction is proportional to the output current of said power pole switch.

8. The method of claim 7, wherein said power pole switch includes a series connection of two switching transistors and said predetermined delay time is greater than or equal to the maximum turn off time of said transistors.

9. A method of controlling the switching of a power pole switch comprising a series connection of a pair of switching transistors and a diode connected in parallel with each of said transistors wherein said transistors alternately switch in response to transition points in a reference signal, said method comprising the steps of:
    delaying each transition point in said reference signal by a predetermined delay time; and
    reducing the delay time for transition points in said reference signal which occur when one of said transistors is conducting current.

10. The method of claim 9, wherein said predetermined delay time is greater than or equal to the maximum turn off time of said transistors.

* * * * *